Feb. 26, 1957  D. C. LOCKE  2,783,367
LAMP MOUNT FOR AUTOMOTIVE VEHICLES
Filed Sept. 20, 1955
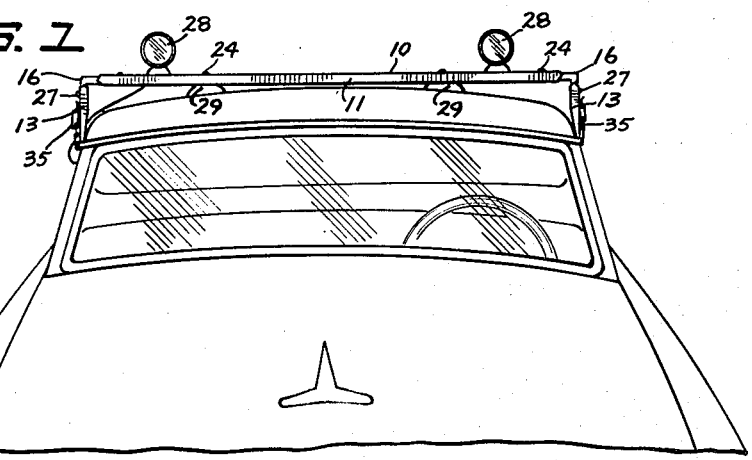
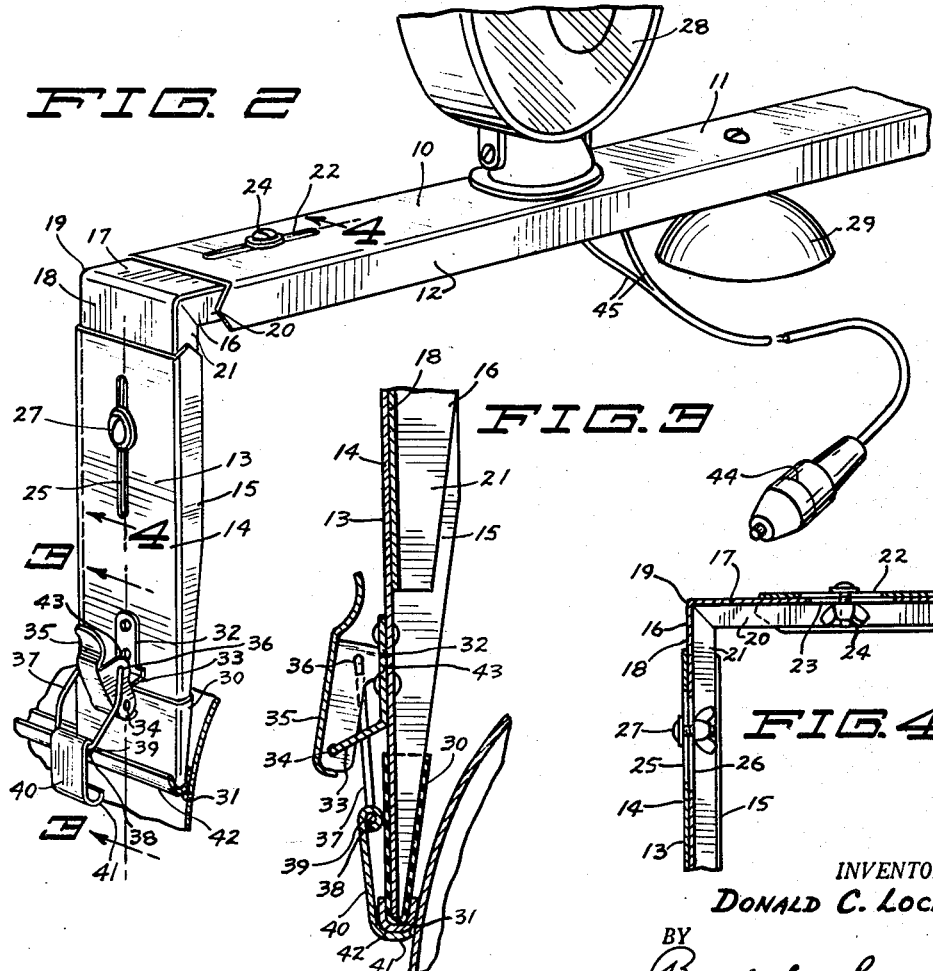
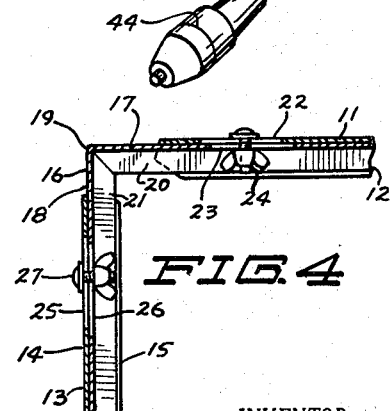
INVENTOR.
DONALD C. LOCKE
BY
Braddock and Braddock
ATTORNEYS

United States Patent Office 2,783,367
Patented Feb. 26, 1957

2,783,367
LAMP MOUNT FOR AUTOMOTIVE VEHICLES

Donald C. Locke, Fulda, Minn.

Application September 20, 1955, Serial No. 535,383

3 Claims. (Cl. 240—52.1)

The invention herein has relation to a new and improved device including lamps to be detachably supported upon the top of an automotive vehicle, as when employed as an ambulance, or for other emergency purposes.

In the accompanying drawing forming a part of this specification,

Fig. 1 is a front elevational vew of a lamp mount for automotive vehicles made according to the invention as when applied to use;

Fig. 2 is an enlarged perspective view disclosing parts of the lamp mount and illustrating the manner in which it is detachably applied, to a rain or drip trough of an automotive vehicle, being shown partially in perspective and partially in section;

Fig. 3 is an enlarged sectional view, taken on line 3—3 in Fig. 2; and

Fig. 4 is a sectional view, taken on line 4—4 in Fig. 2.

An elongated frame 10 of the lamp mount, to extend transversely of an automotive vehicle above the top thereof, is constituted as a channel bar, a body 11 of which is horizontally disposed and side flanges 12 of which extend downwardly when said lamp mount is applied to use.

Each of a pair of upright elements 13 of said lamp mount for supporting the elongated frame or channel bar 10, is disposed outwardly of the opposite ends, respectively, of said elongated frame or channel bar to extend downwardly at the opposite sides of an automotive vehicle, and is constituted as a channel piece, a body 14 of which is vertically disposed and side flanges 15 of which extend inwardly toward said automotive vehicle.

Each of a pair of connectors 16 of the lamp mount, for connecting the upright elements or channel pieces 13 with the opposite ends, respectively, of the elongated frame or channel bar 10, is constituted as an L-shape channel piece. A body of each connector or L-shape channel piece 16 includes inwardly and downwardly extending body parts, denoted 17 and 18, respectively, which meet at an apex 19 of the corresponding connector or L-shape channel piece. Flanges 20 extend downwardly from the opposite side edges of the body part 17 and flanges 21 extend inwardly from the opposite side edges of the body part 18.

The inner end portions of the body part 17 and the flanges 20 of each connector or L-shape channel piece 16 are telescopically fitted to the adjacent end portions of the body 11 and the flanges 12 of the elongated frame or channel member 10 in such manner that an upper surface of said body part 17 and exterior surfaces of said flanges 20 are slidable over a lower surface of said body 11 and interior surfaces of said flanges 12, respectively. Each of the opposite end portions of the body of the elongated frame or channel member 10 is provided with a longitudinal slot 22 and the inner end portion of the body part 17 of each connector or L-shape channel piece 16 is provided with a longitudinal slot 23, and a headed and nutted bolt in each set of longitudinal slots 22, 23 is indicated 24. The headed and nutted bolts 24 when loosened will permit adjustment of the connectors or L-shape channel pieces 16 inwardly and outwardly longitudinally of the elongated frame or channel member, and when tightened down will secure said elongated frame or channel member and said connectors or L-shape channel pieces in fixed parallel relation to each other.

The lower end portion of the body part 18 and the flanges 21 of each connector or L-shape channel piece are telescopically fitted to the upper end portion of the body 14 and the flanges 15 of the adjacent upright element or channel piece 13 so that an exterior surface of said body part 18 and exterior surfaces of said flanges 21 are slidable over an interior surface of said body 14 and interior surfaces of said flanges 15, respectively. The upper end portion of the body 14 of each upright element or channel piece 13 is provided with a longitudinal slot 25, the lower end portion of said body part 18 of each connector or L-shape channel piece 16 is provided with a longitudinal slot 26, and a headed and nutted bolt in each set of longitudinal slots 25, 26 is indicated 27. The headed and nutted bolts 27 when loosened will permit adjustment of the upright elements or channel pieces 13 upwardly and downwardly relative to the connectors or L-shape channel pieces 16, toward and away from the elongated frame or channel member, and when tightened down will secure said upright elements or channel pieces and said connectors or L-shape channel pieces in fixed parallel relation to each other.

Although a single lamp could be employed, a pair of spaced lamps, each represented 28, are supported upon the upper surface of the elongated frame or channel member 10.

The lower surface of said elongated frame or channel member fixedly supports spaced vacuum cups, each denoted 29, to be engaged and retained by suction against the upper surface of the top of an automotive vehicle, as in Fig. 1 of the drawing.

The lower end portion of each of the upright elements or channel pieces 13 supports a shoe 30 to be seated, as best disclosed in Figs. 2 and 3, against the upwardly facing base surface of the adjacent rain or drip trough 31 of an automotive vehicle. The shoes 30 desirably can be of plastic or rubber, or of other material not liable to cause the automotive vehicle to be harmed.

The overall length of the elongated frame or channel member 10 and the parts of the connectors or L-shape channel pieces 16 alined therewith will be adjusted to situate the upright elements or channel pieces 13 and the shoes 30 thereon at a distance apart equal to a measurement representing the distance between troughs 31 at the opposite sides, respectively, of an automotive vehicle, and the overall length of said upright elements or channel pieces and the parts of said connectors or L-shape channel pieces alined therewith will be adjusted to situate said shoes against the upwardly facing base surfaces of said troughs when the vacuum cups 29 are engaged and retained by suction against the upper surface of the top of said automotive vehicle.

Clamps are included for detachably fastening each upright element or channel piece 13 and the shoe 30 thereon down against the rain or drip trough 31 at the corresponding side of the automotive vehicle, thus to secure the lamp mount and the suction cups thereof in fixed position upon said automotive vehicle. The clamps are of duplicate construction.

A vertical bracket 32 of each clamp, mounted upon the exterior surface of a lower end portion of the body 14 of the corresponding upright element or channel piece 13, includes a downwardly and outwardly extending projection 33 which pivotally supports, as at 34, an inner end of a manually manipulable lever 35. An outer end portion of said lever pivotally supports, as at 36, spaced arms of a U-shape resilient members 37. A base 38 of said resilient member pivotally supports, as at 39, an upper end of a clamp element 40 including an inwardly and upwardly extending hook 41 at its lower end for engagement, as in Figs. 1 and 3, against the lower surface 42 of the rain or drip trough 31 at the corresponding side of the automotive vehicle. The hook of the clamp element desirably can be coated with plastic or rubber.

In Fig. 2 the clamp for detachably fastening the upright element or channel piece 13 and shoe 30 thereon down against the rain or drip trough 31 is disclosed as when in released condition. In Fig. 3 said clamp is shown as when operative to secure an end portion of the elongated frame or channel member 10 in fixed position upon an automotive vehicle. In said Fig. 3 the arms of the U-shape resilient member 37 have been tensioned by reason of swinging of the lever 35 upwardly from about its position as in Fig. 2 to position where the pivotal support 36 is situated beyond dead center position, at the inner side of the pivotal support 34, and surfaces 43 at an outer end portion of said lever are engaged against the external surface of the vertical bracket 32. Stated otherwise, swinging of the lever 35 from about the position as in Fig. 2 to the position as in Fig. 3 causes the arms of the U-shape resilient member 37 to be tensioned thus to cause the shoe 30 and the hook 41 to be resiliently clamped against the upper and lower surfaces, respectively, of the rain or drip trough 31, and also causes said lever to be swung beyond dead center position and against said vertical bracket 32 thus to retain the arms of the U-shape resilient member in tensioned condition. The clamps of the lamp mount can be released from the rain or drip troughs of an automotive vehicle merely by swinging the levers 35 from position as in Fig. 3 toward position as in Fig. 2.

The lamps 28 desirably will be double faced and have red back and front lenses. A plug 44 in a circuit for said lamps can be inserted in the cigarette lighter socket customarily on the dash boards of automotive vehicles thus to cause the lamps to be energized. Lead wires 45 extend from the plug 44 to said lamps. Flasher mechanism (not shown) of ordinary or preferred construction can be employed.

The lamp mount herein illustrated and described is readily and easily applicable to and removable from an automotive vehicle without the necessity of making any alterations upon the vehicle, and application of the lamp mount to, its use upon and removal from a vehicle can be accomplished without in any way marring the original surfaces of the vehicle. Advantageous uses to which the lamp mount can be put will be obvious. For an instance, funeral directors need to employ automotive vehicles for various purposes. In some cases, as when automotive vehicles are used as ambulances, it is necessary that flasher lamps be upon the vehicles. In other cases, as when automotive vehicles are in funeral processions, or used for a variety of purposes, it is undesirable, really inappropriate, that flasher lamps be on the vehicles.

What is claimed is:

1. A lamp mount for automotive vehicles comprising an elongated frame to extend transversely of an automotive vehicle above the top thereof, a lamp upon said elongated frame, upright elements disposed outwardly of and rigidly connected to opposite ends, respectively, of said elongated frame, each of said upright elements including a lower surface to be supported upon an upwardly facing surface of a trough of said automotive vehicle at the corresponding side thereof, a manually manipulatable lever disposed outwardly of and in adjacent relation to each of said upright elements, means pivotally supporting an inner end portion of each of said levers upon the corresponding upright element for swinging movement in a vertical plane between a lower position and an upper dead center position, a longitudinally resilient member pivotally supported upon an outer end portion of each of said levers and extending downwardly therefrom, and a clamp element pivotally supported upon a lower portion of each of said resilient members and including a hook portion having an upwardly facing surface to be pressingly engaged up against a lower surface of the trough of the automotive vehicle at the corresponding side thereof, thus to cause the lower surface of the corresponding upright element to be pressingly engaged down against the corresponding trough, in response to upward swinging movement of the corresponding lever to dead center position.

2. A lamp mount for automotive vehicles comprising an elongated frame to extend transversely of an automotive vehicle above the top thereof, a lamp upon said elongated frame, a vacuum cup upon the elongated frame to be engaged against an upper surface of said automotive vehicle top, upright elements disposed outwardly of and rigidly connected to opposite ends, respectively, of said elongated frame, each of said upright elements including a lower surface to be supported upon an upwardly facing surface of a trough of said automotive vehicle at the corresponding side thereof, a manually manipulatable lever disposed outwardly of and in adjacent relation to each of said upright elements, means pivotally supporting an inner end portion of each of said levers upon the corresponding upright element for swinging movement in a vertical plane between a lower position and an upper dead center position, a longitudinally resilient member pivotally supported upon an outer end portion of each of said levers and extending downwardly therefrom, and a clamp element pivotally supported upon a lower portion of each of said resilient members and including a hook portion having an upwardly facing surface to be pressingly engaged up against a lower surface of the trough of the automotive vehicle at the corresponding side thereof, thus to cause the lower surface of the corresponding upright element to be pressingly engaged down against the corresponding trough and said vacuum cup to be pressingly engaged down against said upper surface of the automotive vehicle top, in response to upward swinging movement of the corresponding lever to dead center position.

3. The combination as specified in claim 2 wherein said elongated frame and each of said upright elements are adjustable as to length.

References Cited in the file of this patent

UNITED STATES PATENTS

| | | |
|---|---|---|
| 1,505,608 | Seely | Aug. 19, 1924 |
| 2,080,527 | Bixel | May 18, 1937 |
| 2,584,292 | Rogers | Feb. 5, 1952 |
| 2,596,860 | McCrory et al. | May 13, 1952 |
| 2,675,545 | Wolper | Apr. 13, 1954 |